United States Patent [19]

McFarland

[11] Patent Number: 4,473,763
[45] Date of Patent: Sep. 25, 1984

[54] SOLENOID MOTOR

[76] Inventor: Douglas F. McFarland, Davis City, Iowa 50065

[21] Appl. No.: 307,172

[22] Filed: Sep. 30, 1981

Related U.S. Application Data

[63] Continuation-in-part of Ser. No. 113,784, Jan. 21, 1980, abandoned.

[51] Int. Cl.² .......................................... H02K 33/00
[52] U.S. Cl. ...................................... 310/24; 310/34; 310/35
[58] Field of Search .................... 310/23, 24, 34, 35

[56] References Cited

U.S. PATENT DOCUMENTS

| | | | |
|---|---|---|---|
| 2,056,719 | 10/1936 | Gelnaw | 310/35 X |
| 2,588,753 | 3/1952 | Norton | 310/35 |
| 2,639,544 | 5/1953 | Coffin | 310/35 X |
| 3,949,249 | 4/1976 | Wiseley et al. | 310/23 X |
| 4,317,058 | 2/1982 | Blalock | 310/24 |

Primary Examiner—Donovan F. Duggan
Attorney, Agent, or Firm—Zarley, McKee, Thomte, Voorhees & Sease

[57] ABSTRACT

A solenoid motor comprising a crankshaft with a plurality of solenoid means positioned adjacent thereto. Each solenoid means comprises a cylindrical core with an electrical coil wound therearound. A piston means is slidably mounted in each of said cores and is longitudinally movably responsive to the polarity of the coils. Connecting rods are pivotally connected by their opposite ends to the piston means and the crankshaft. An electrical control means is operatively connected to the coils to sequentially control the electrical polarity of the coils wherein longitudinal movement of the piston means is sequentially induced to impart rotational motion to the crankshaft.

7 Claims, 16 Drawing Figures

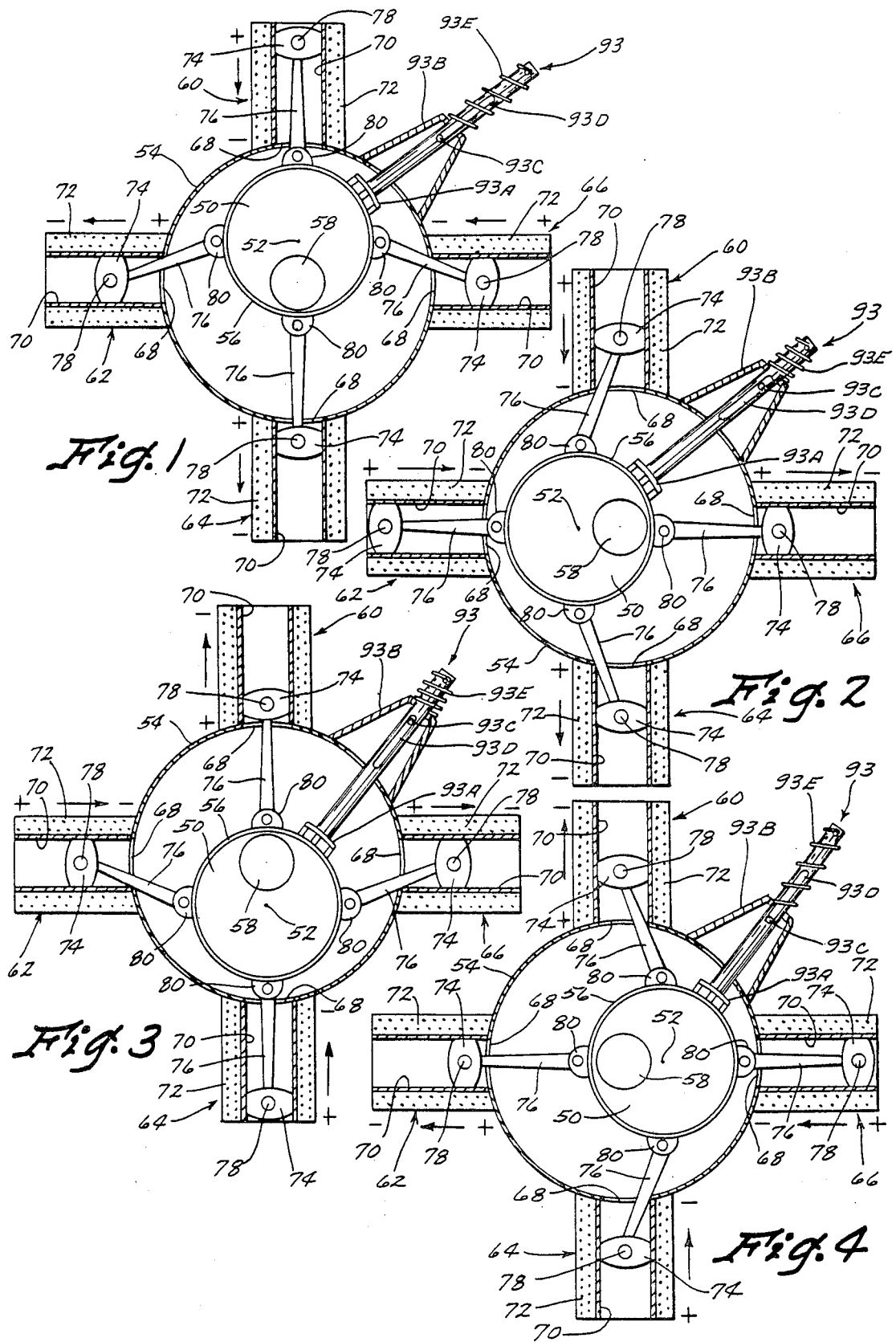

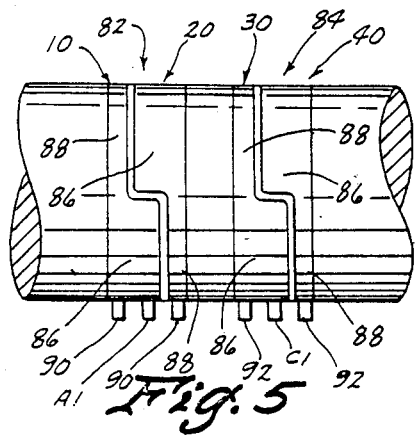
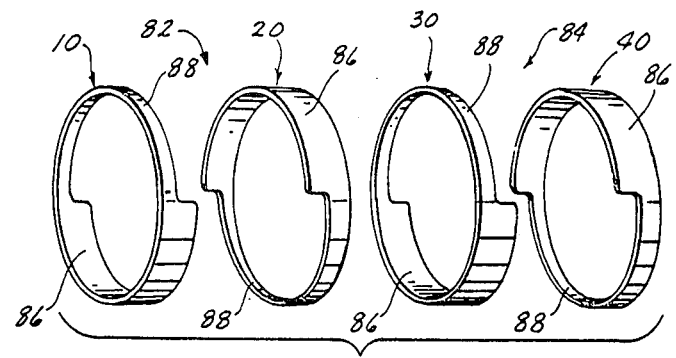
Fig. 5
Fig. 6
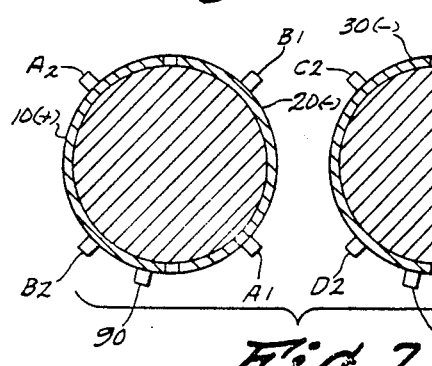
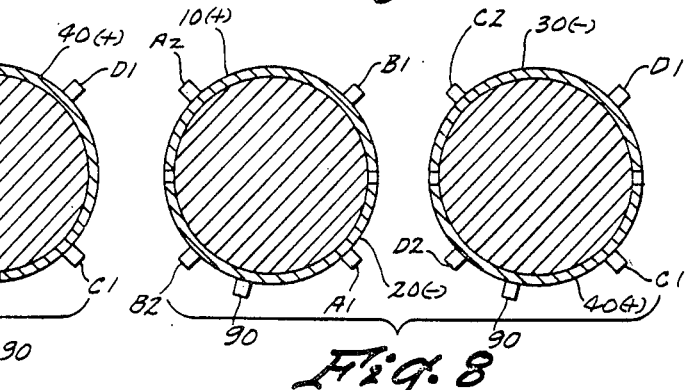
Fig. 7
Fig. 8
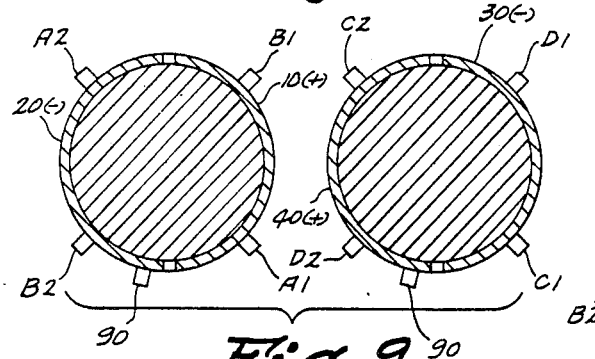
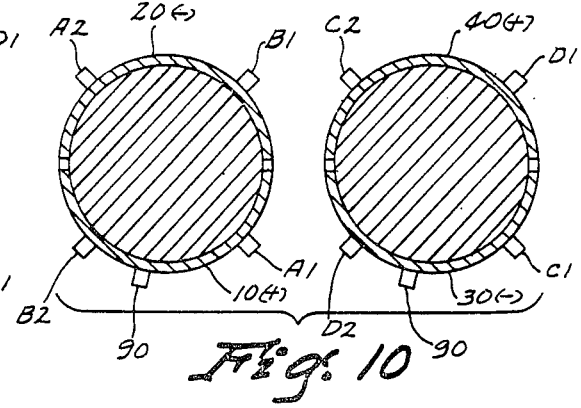
Fig. 9
Fig. 10

4,473,763

SOLENOID MOTOR

CROSS REFERENCE TO RELATED APPLICATION

This application is a continuation-in-part of U.S. patent application Ser. No. 113,784, filed on Jan. 21, 1980, now abandoned.

BACKGROUND OF THE INVENTION

Magnetic motors have existed in the prior art but have lacked the ability to perform under varying conditions and they have also experienced limitations as to the power which can be created. The instant invention overcomes the shortcomings of the prior art by utilizing solenoids to impart rotational motion to a conventional motor crankshaft. The power of the solenoids is determined by the magnitude of the coils used thereon wherein performance characteristics and power capabilities can be made to exceed the conventional magnetic motor.

SUMMARY OF THE INVENTION

The instant invention contemplates a solenoid motor utilizing a conventional crankshaft having a plurality of solenoid elements positioned adjacent thereto. In a preferred embodiment, each of the solenoids has an electrical coil wound around a cylindrical core with a polarized piston means slidably mounted in the core and being longitudinally, movably responsive to the polarity of the coils. Connecting rods are pivotally connected by their opposite ends to the piston means and the crankshaft, respectively. Electrical control means comprised essentially of brushes on the crankshaft are connected to the coils to sequentially control the electrical polarity thereof to sequentially impart longitudinal movement to the piston means to impart rotational motion to the crankshaft. In an alternate embodiment, pairs of aligned conventional solenoids each have a pair of interconnected pistons pivotally connected to the connecting rods for imparting continuous rotational movement to the crankshaft in response to alternating energization of the solenoids of each pair.

It is an object of this invention to overcome the frictional problems of prior crankshaft-type motors.

It is a further object of this invention to provide a solenoid motor which has a wide range of power capabilities.

It is a further object of this invention to provide a solenoid motor which is economical in manufacture, and durable in use.

These and other objects will be apparent to those skilled in the art.

BRIEF DESCRIPTION OF THE DRAWINGS

FIG. 1 is a schematic sectional view through the solenoid motor of this invention showing the crankshaft in a first position;

FIG. 2 is a sectional view similar to that of FIG. 1 showing the crankshaft having rotated 90° with respect to the position of FIG. 1;

FIG. 3 is a sectional view similar to that of FIG. 2 showing the crankshaft having rotated 90° with respect to the position of FIG. 2;

FIG. 4 is a sectional view similar to that of FIG. 3 showing the crankshaft having rotated 90° with respect to the position of FIG. 3;

FIG. 5 a schematic elevational view of the crankshaft with control brushes thereon;

FIG. 6 is an exploded perspective view of the brush elements of FIG. 5;

FIG. 7 represents a sectional view through the two brushes of FIG. 5 showing the polarity of the solenoids of FIG. 1;

FIG. 8 represents a sectional view through the two brushes of FIG. 5 showing the polarity of the solenoids of FIG. 2;

FIG. 9 represents a sectional view through the two brushes of FIG. 5 showing the polarity of the solenoids of FIG. 3;

FIG. 10 represents a sectional view through the two brushes of FIG. 5 showing the polarity of the solenoids of FIG. 4;

DESCRIPTION OF THE PREFERRED EMBODIMENT

Figure 11:
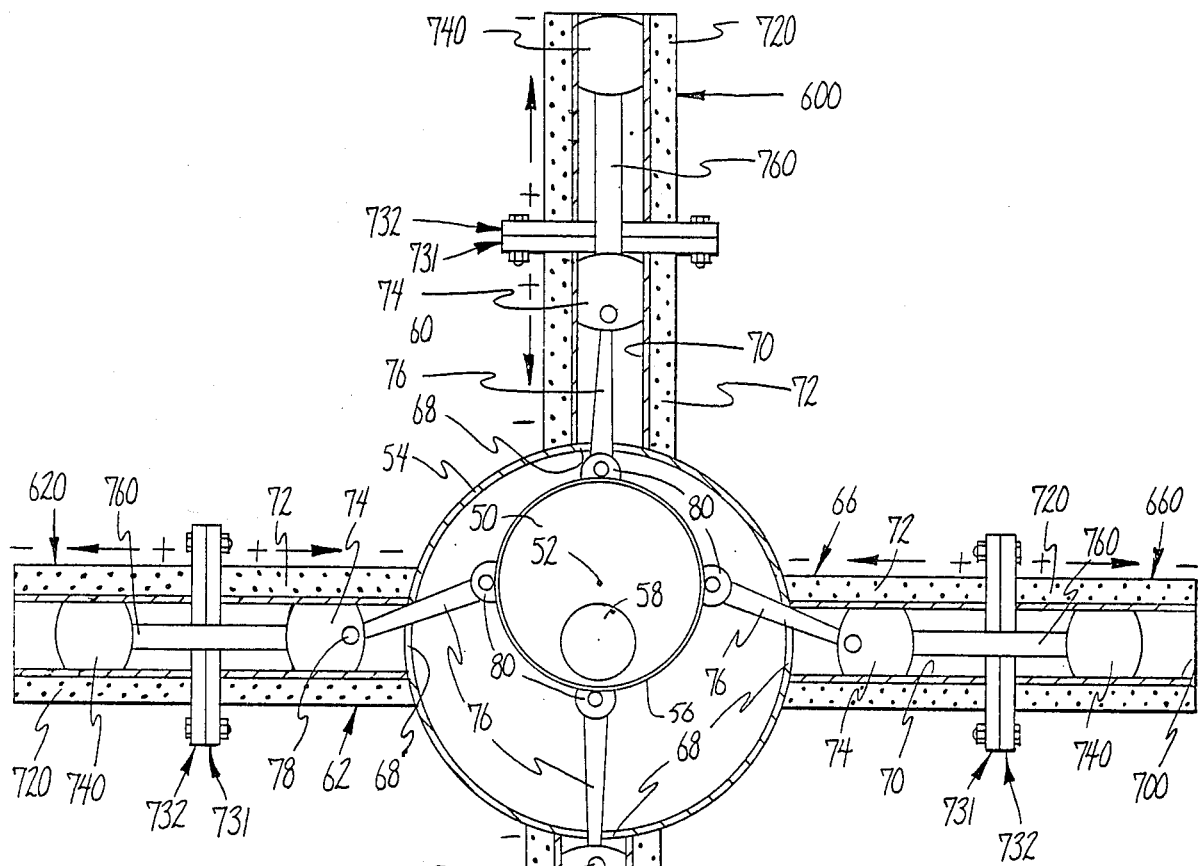
FIG. 11 is a schematic sectional view through an alternate embodiment of the invention including multiple pairs of stacked solenoids.

A crankshaft having a center longitudinal axis 52 is mounted within cylindrical housing 54 and consists of a crank portion 50 which is rotatably mounted within a crank portion sleeve 56. The crank portion 50 terminates in shaft portions 58. The crank shaft could also be of a U-shape as is known in the art.

A plurality of solenoids 60, 62, 64 and 66, preferably an even number thereof, are mounted on the outer surface of housing 54 over suitable apertures 68 in the housing. Each solenoid is of conventional construction and includes a cylindrical core 70, and a coil 72 wound on the outside of the core. Each core has a polarized piston 74 which is longitudinally movable within the core and which has its direction of movement determined by the polarity of the coils 72. To this extent, the solenoids are of conventional construction.

Each piston 74 is pivotally connected to one end of connecting rods 76 by pins 78. The opposite ends of rods 76 are pivotally connected to uniformly spaced connectors 80 which are secured to crank portion sleeve 56.

Brush assemblies 82, and 84 (FIG. 5) are secured to either the portions 50 or 58 of the crankshaft. The brush assembly 82 is comprised of first and second spaced apart conductors 10 and 20; and brush assembly 84 is comprised of first and second spaced apart conductors 30 and 40. The conductors should be insulated from the crankshaft by any conventional means. Each conductor is comprised of a continuous band of wide and narrow segments 86 and 88, respectively. The conductors 10 and 20, and the conductors 30 and 40 are nested in the relationship shown in FIG. 5. Brushes 90 and 92 are connected to ground and are rigidly secured to a spring loaded plunger 93 and are adapted to always be in wiping electrical contact with one of the conductors. Plunger 93 has shoe 93A on its inner end upon which the brushes are mounted. Plunger 93 is pivotally connected within bracket 93B by pin 93C which extends through slot 93D in the plunger. Compression spring 93E yieldably forces plunger 93 inwardly.

As shown in FIGS. 7-10, brushes A1 and A2 are centrally positioned with respect to brush assembly 82 and are rigidly secured to a stationary bracket (not shown) to always be in wiping electrical contact with one of the conductors 10 or 20. Brushes B1 and B2 are similarly positioned with respect to brush assembly 82. Pairs of brushes A1 and A2, and B1 and B2, are positioned 180° apart which locates a brush each 90° on the periphery of the brush assembly 82. Brushes C1 and C2, and D1 and D2 are positioned with respect to brush assembly 84 in the same way that brushes A1 and A2, and B1 and B2, respectively, are positioned with respect to brush assembly 82.

For purposes of clarity, conductors 10 and 40 have been denominated as "positive" (i.e. +) in the drawings, and conductors 20 and 30 have been denominated as "negative" (i.e. —). This characterization may be achieved in a variety of ways, such as by directing direct current flow in one direction to the conductor through the brushes in one of two directions, well within the ability of one skilled in the art. The important phenomenon is that when a brush is in contact with a "positive" conductor, current flow passes through a solenoid coil in one direction, and when a brush is in contact with a "negative" conductor, current flow is reversed. Accordingly, each of the brushes are in contact with a suitable source of D.C. power. Brushes A1 and A2 are connected to opposite ends of the coil 72 in solenoid 60; brushes B1 and B2 are in contact with opposite ends of the coil 72 in solenoid 66; brushes C1 and C2 are in contact with opposite ends of the coil on solenoid 64; and brushes D1 and D2 are in contact with opposite ends of the coil in solenoid 62.

When electrical power is supplied to the brushes as described above, with the components as shown in FIG. 1, the polarity of the solenoid coils is established as shown in that figure, thus causing the polarized pistons 74 in the solenoids to move in the direction of the arrows shown in that figure. This will impart a counterclockwise motion to the crankshaft as viewed in FIG. 1. The corresponding relationship of the brushes with their conductors is shown in FIG. 7. When the crankshaft reaches the "9 o'clock" position shown in FIG. 2, the polarity of the solenoids 62 and 66 is reversed as shown by the brush-conductor relationship of FIG. 8. The polarity of solenoids 60 and 64 remain the same, and the crankshaft is then moved to the "6 o'clock" position of FIG. 3. At that point, the polarity of solenoids 60 and 64 is reversed, while the polarity of solenoids 62 and 66 remains the same (FIGS. 3 and 9). When the crankshaft reaches the "3 o'clock" position of FIG. 4, the polarity of solenoids 62 and 66 reverses (see FIG. 10) and the crankshaft is moved back to the position of FIG. 1 where the cycle is repeated. Again, the arrows in FIGS. 1-4 denote the direction of travel of the pistons in the solenoids as induced by the polarity of the solenoid coils.

Referring to FIG. 11, an alternate embodiment of the invention is shown including a plurality of pairs of stacked solenoids. Since much of the construction of the embodiment of FIG. 11 is similar to that of the previous embodiment of FIG. 1, like reference numerals are used to identify like parts of both.

Solenoids 60, 62, 64 and 66 are mounted on the outer surface of housing 54 over suitable apertures 68 just as in the prior embodiment. Furthermore, each solenoid includes a cylindrical core 70, and a coil 72 wound on the outside of the core. A nonpolarized piston 74 of a ferrous material or the like is longitudinally movable within the core 70 and has its direction of movement determined by the polarity and direction of winding of the coils 72.

The outer end of each solenoid 60, 62, 64 and 66 is provided with a mounting flange 731 to which a similar mounting flange 732 of outer solenoids 600, 620, 640, and 660 are connected to, respectively, by bolts as shown.

Outer solenoids 600, 620, 640 and 660 likewise include a cylindrical core 700 having a coil 720 wound therearound and a nonpolarized piston 740 longitudinally movable therethrough. The mounting flanges 731 and 732 are arranged relative to their respective solenoids so that upon fastening them together, the core of the outer solenoid is axially aligned with the core of the respective inner solenoid on which it is mounted.

A linkage 760 interconnects each respective pair of an inner piston 74 and an outer piston 740 for longitudinal movement in unison. The linkage 760 extends through and is slidably mounted in center openings through mounting flanges 731 and 732. The inner pistons 74 are pivotally connected by pins 78 to one end of respective connecting rods 76, the opposite ends of which are pivotally connected to uniformly spaced connectors 80 on crank portion sleeve 56.

Figure 12:
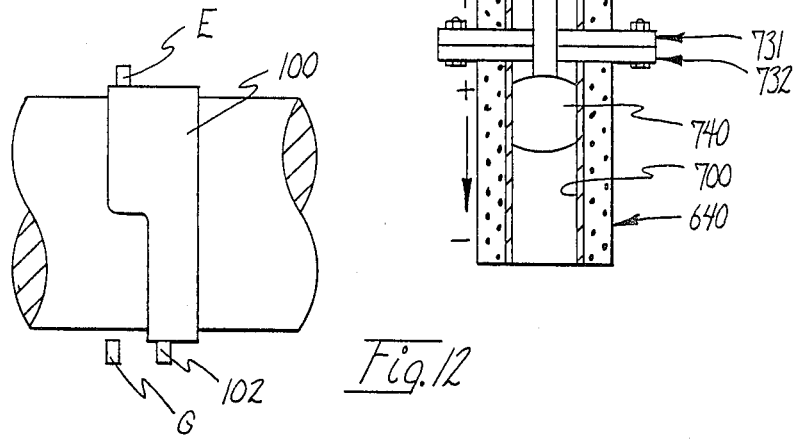
FIG. 12 is a schematic elevational view of the crankshaft with control brushes thereon.

The brush assembly for the embodiment of FIG. 11 is shown in FIG. 12. A single ring conductor 100 is secured to either the portion 50 or 58 of the crankshaft and electrically insulated therefrom by any conventional means. Conductor 100 includes wide and narrow circumferential segments as in the prior embodiment. The wide segment of annular connector 100 extends around the conductor approximately 180° and preferably just slightly less than that to prevent energization of opposing solenoids as explained hereinbelow.

Rather than alternating the polarity of individual solenoids as in the prior embodiment, the brush assembly in FIG. 12 acts as a switch for alternately energizing and de-energizing the various solenoids of the embodiment of FIG. 11.

To facilitate discussion, the opposite ends of the coils of all of the solenoids have been labeled "positive" (i.e. +) and "negative" (i.e. —). All of the positive ends or all of the negative ends are permanently electrically connected to one terminal of an electrical power source, with all of the opposite ends of the coils being connected to the opposite terminal of the electrical power source (not shown) through the switch conductor 100. More specifically, the opposite terminal of the power source is electrically connected to a brush 102 (FIG. 12) which is supported on a stationary bracket (not shown) at a position in constant wiping electrical contact with the narrow segment of conductor 100. A series of four additional brushes, referred by reference letters E, F, G and H, are supported in axially spaced relation from brush 102 for electrical wiping contact only with the wide segment of conductor 100 depending upon the rotational position of the crankshaft. To the contrary, brush 102 is at all times in wiping electrical contact with conductor 100 as is evident in FIG. 12.

Brushes E, F, G and H are arranged in circumferentially spaced-apart positions around annular conductor 100 and uniformly spaced 90° apart from one another.

Assuming for purposes of discussion that the positive ends of all of the solenoid coils are connected directly to the power source, the negative ends of the coils of solenoids 60 and 640 are electrically connected to brush E; the negative ends of the coils of solenoids 62 and 660 are electrically connected to brush F; the negative ends of the coils solenoids 64 and 600 are electrically connected to brush G; and the negative ends of the coils of solenoids 66 and 620 are electrically connected to brush H.

Figures 13, 14, 15, 16:
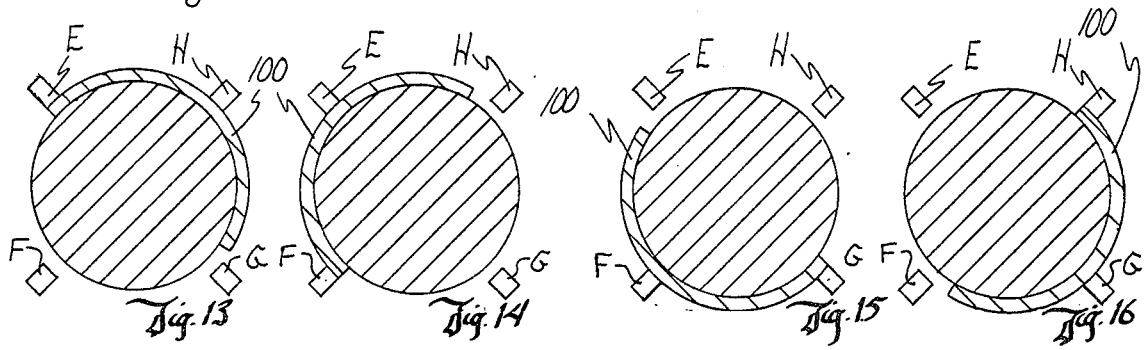
FIG. 13 represents a sectional view through the brushes of FIG. 12 showing the polarity of the solenoids of FIG. 11.
FIG. 14 represents a sectional view through the brushes of FIG. 12 showing the polarity of the solenoids when the crankshaft is rotated 90° counter-clockwise from the position of FIG. 11.
FIG. 15 represents a sectional view through the brushes of FIG. 12 showing the polarity of the solenoids when the crankshaft is rotated 180° counter-clockwise from the position of FIG. 11.
FIG. 16 represents a sectional view through the brushes of FIG. 12 showing the polarity of the solenoids when the crankshaft is rotated 270° counter-clockwise from the position of FIG. 11.

In operation, when the crankshaft is in the "12 o'clock" position of FIG. 11, the wide segment of annular conductor 100 is positioned relative to the brushes as shown in FIG. 13. Accordingly, it is seen that a circuit is completed from brush 102 through the conductor 100 to brushes E and H. Thus, solenoids 60, 640, 66 and 620 are energized to effect a movement of their respective pistons in the direction of the arrows shown adjacent the respective solenoids.

From the position of FIG. 11, the crankshaft is rotated counter-clockwise to the "9 o'clock" position whereupon the wide segment of conductor 100 is moved to the position indicated in FIG. 14. Upon breaking contact with brush H, solenoids 66 and 620 are de-energized. Practically instantaneously thereafter, conductor 100 engages brush F thereby energizing solenoids 62 and 660. Solenoids 62 and 660 urge the crankshaft to the right (as seen in FIG. 11) and solenoids 60 and 640 continue to urge the crankshaft downwardly to the "6 o'clock" position, whereupon the wide segment of conductor 100 is moved to the position of FIG. 15. Solenoids 60 and 640 are de-energized and solenoids 64 and 600 are energized due to the electrical connection through brush G. The crankshaft is rotated further in a counter-clockwise position to the "3 o'clock" position with the wide segment of conductor 100 being moved to the position of FIG. 16. At this point, solenoids 62 and 660 are de-energized and solenoids 66 and 620 are energized to collectively urge the crankshaft upwardly and to the left for returning it to the "12 o'clock" position of FIG. 11.

This operation continues automatically with the energization and de-energization of the individual solenoids being responsive to the rotation of the crankshaft.

The direction of piston movement upon energization of a given solenoid is determined by two factors. First, the opposite ends of the coil 72 or 720 must be properly electrically connected to the power source as described above. Secondly, the direction of winding of the coils must be such that upon energization, the piston is moved in the direction indicated by the arrows adjacent each solenoid in FIG. 11. It is important that the solenoids of each pair be arranged for urging their respective pistons in opposite directions. The switching arrangement described in connection with FIGS. 12–16 prevents simultaneous energization of both solenoids of any given pair and also assures that each pair has at least one solenoid energized substantially continuously. Accordingly, the solenoids of each pair are alternately energized so as to sequentially move the piston pairs in opposite directions whereby rotational movement in one direction is imparted to the crankshaft.

From the foregoing, it is seen that solenoids of any power can be applied to a conventional crankshaft to create a practical and efficient motor.

I claim:

1. A solenoid motor, comprising,
a crankshaft,
a plurality of solenoid means positioned adjacent said crankshaft, each solenoid means comprising a first cylindrical core with a first electrical coil wound therearound and a first piston means slidably mounted on said first core, said first piston means being moved in one longitudinal direction in response to energization of said first electrical coil, and a second elongated cylindrical core axially aligned with said first core and having a second electrical coil wound therearound and a second piston slidably mounted in said second core, said second piston means being moved in an opposite longitudinal direction in response to energization of said second electrical coil,
a plurality of linkages, each linkage connecting a first piston means to a respective second piston means for longitudinal movement in unison,
connecting rods pivotally connected by their opposite ends to said first piston means and said crankshaft, respectively, and electrical control means operatively connected to said crankshaft and alternately electrically connected to said first and second coils to sequentially control the electrical energization of said coils in response to rotation of said crankshaft,
said first and second coils of each solenoid means being alternately energized so as to sequentially impart longitudinal movement to said piston means in opposite directions whereby rotational motion in one direction is thereby imparted to said crankshaft.

2. The solenoid motor of claim 1 wherein said crankshaft includes a crank portion rotatably mounted within a crank portion sleeve, said connecting rods being pivotally connected to one end to said crank portion sleeve.

3. The solenoid motor of claim 2 wherein said crankshaft has a cam-shaped crank portion.

4. The solenoid motor of claim 2 wherein said crankshaft has a U-shaped crank portion.

5. The solenoid motor of claim 1 wherein said electrical control means includes conducting rings to change the polarity of said coils at different times, said conducting rings being rigidly mounted on said crankshaft and being continuous bands having wider portions and narrower portions which alternatively are in wiping contact with said brushes upon each revolution of said crankshaft.

6. The solenoid motor of claim 5 wherein said conducting rings have a wider portion approximately half way around its circumference, the remaining part being a narrower portion.

7. The device of claim 1 wherein the span of each said electrical coil of each said solenoid means is greater than the length of said poston means.

* * * * *